United States Patent Office 3,400,578
Patented Sept. 10, 1968

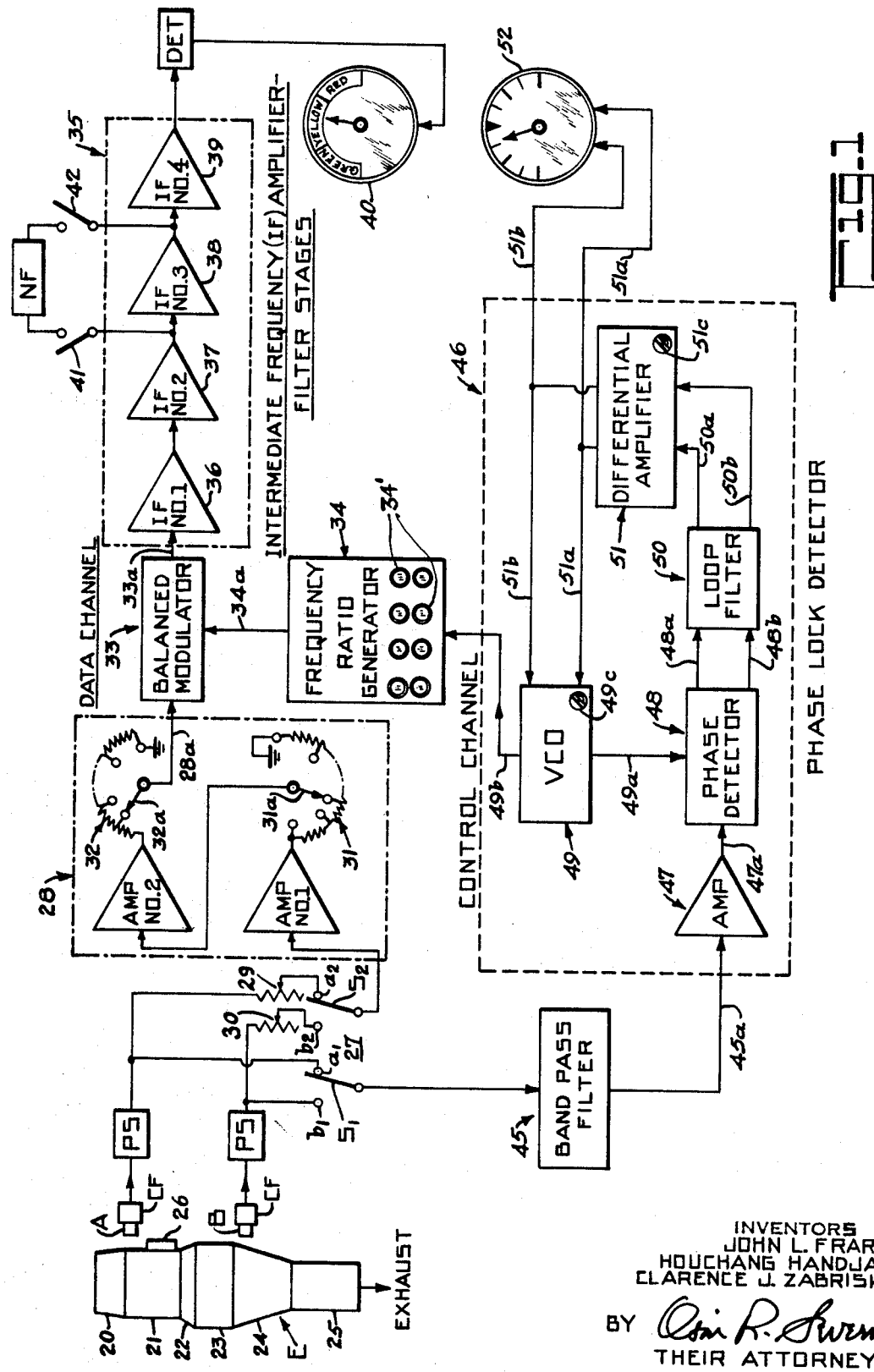

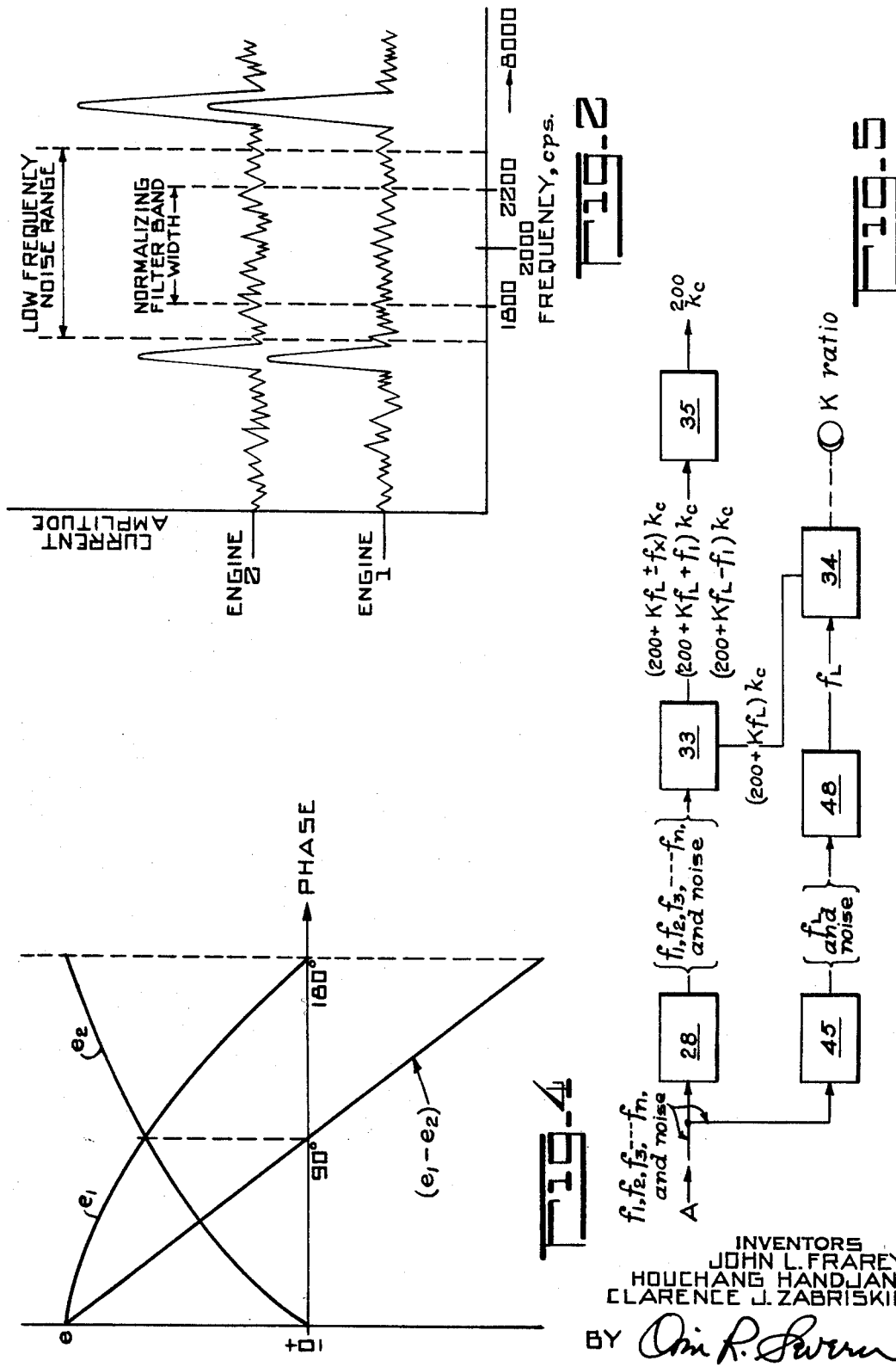

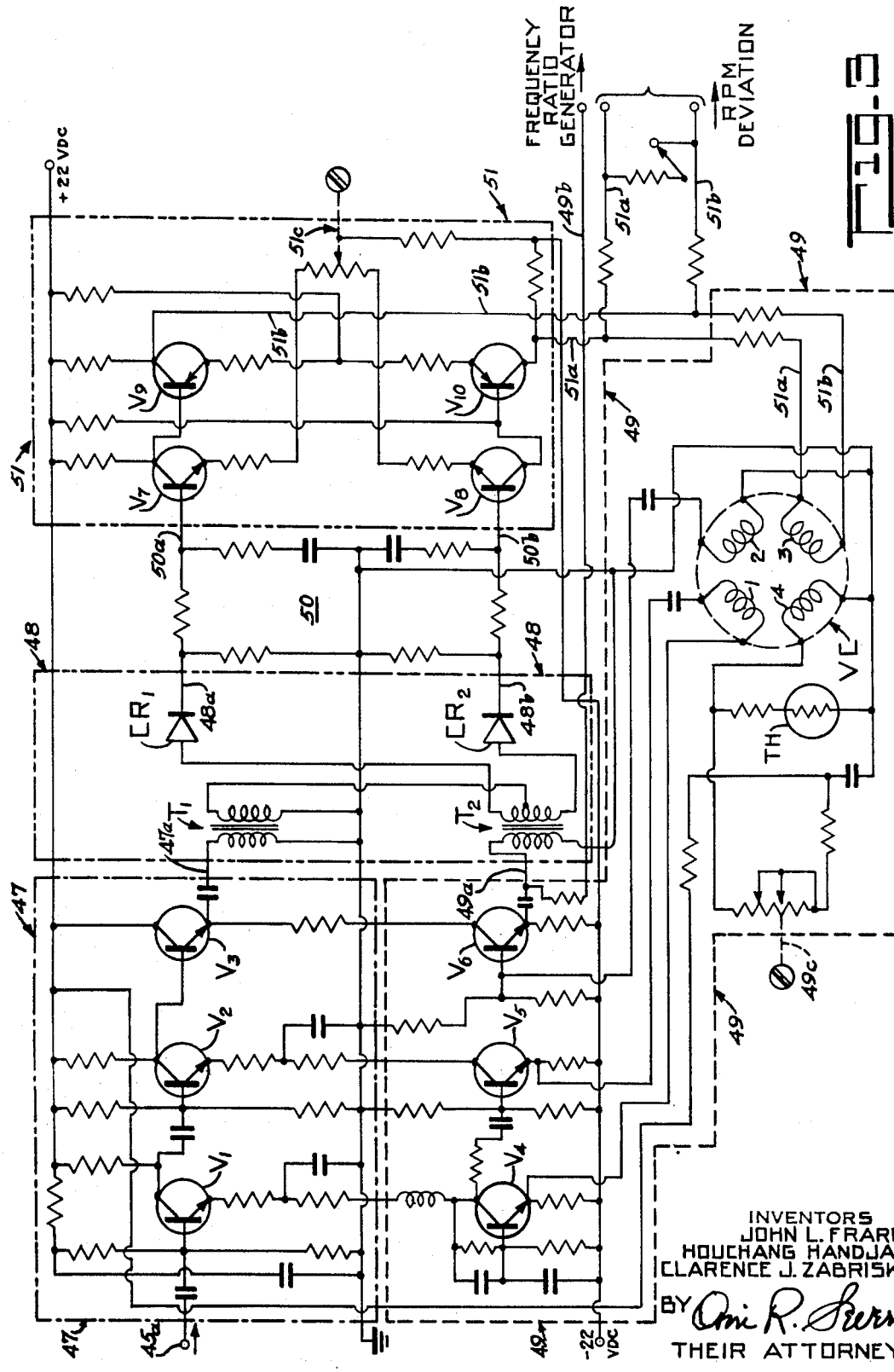

3,400,578
ACOUSTICAL ANALYSER FOR INDICATING FAULTS IN OPERATIVE PARTS OF HIGH-SPEED ENGINES
John L. Frarey, Saddle River, Houchang Handjani, Cedar Grove, and Clarence J. Zabriskie, Mahwah, N.J., assignor to Curtiss-Wright Corporation, a corporation of Delaware
Filed Dec. 6, 1965, Ser. No. 511,667
10 Claims. (Cl. 73—116)

This invention relates to analysers for high-speed engines and, in particular, to acoustical analysers responsive to sound energy transmitted from an engine across an air space to sensitive pick-up means for indicating the mechanical operating condition of a selected engine part or component. The invention is especially useful for on-the-spot testing of turbojet engines having high-speed compressor and turbine stages, together with gear boxes, fuel and oil pumps and like accessories essential to basic engine operation.

Detecting and precisely locating potentially dangerous mechanical faults in jet engines has long been a major problem for the maintenance personnel. Where a fault or malfunction was believed to exist, the engine, as to the part in question, was generally "taken down" and carefully inspected. An incorrect "guess" usually resulted in unnecessary and expensive "down time" on the engine and further search. Even where the engine is down for general or over-all inspection, the cause of an actual or incipient malfunction may not at once be noticed, since it may appear only under dynamic conditions, i.e., during high-speed operation, examples being main bearing and gear-teeth defects, and the like.

Detection of incipient malfunction, on the other hand, requires selective and critical examination of a considerable number of engine parts, any one of which may have a small defect that later could cause serious malfunction or engine failure. For testing purposes, an established engine reference speed (r.p.m.) is generally set, and any deviation therefrom of the actual r.p.m. of a given component must be compensated in order to obtain uniform and reliable test results. Conventional r.p.m. read-out and tracking methods generally use a tachometer or the like for supplying the engine speed signal. This requires a direct electrical or mechanical connection between the tach and engine; also, in prior practice, vibration pick-ups solidly fastened to the engine block have been used for obtaining mixed signals. This technique is not precise, and moreover is inconvenient and time consuming, especially for on-the-spot field testing where the nacelle-enclosed engine is mounted on an operational aircraft.

There is disclosed in a co-pending application, Ser. No. 443,755, filed Mar. 10, 1965, now abandoned, by John L. Frarey et al. and assigned to the same assignee as the present invention, an improved engine components analyser having acoustical pick-up devices, such as sensitive non-directional microphones, that are placed near one side of the engine proper. There is material air clearance between the microphones and engine so that physical contact is avoided. The output of a microphone located opposite a group of components of the engine to be analysed comprises localized mixed signals of varying frequencies and amplitudes from the selected region, including a basic engine speed or tracking signal. These mixed signals are fed to electronic analysing and r.p.m. tracking equipment for selectively representing by oscilloscope display the operative condition of a component selected for examination. In such tests, the engine nacelle may be left in place with the engine running simply at "idle" r.p.m., thereby greatly facilitating the handling and speed of field testing.

The present invention is an improvement on the analyser of the Frarey et al. appliaction above, and distinguishes therefrom by providing, inter alia, automatic r.p.m. tracking means for in-phase locking a reference speed signal to the engine speed signal, and maintaining the phase lock throughout a wide range of engine speed variations from the reference speed.

Another distinguishing feature of the invention provides for readily changing and/or adjusting critical values and constants of the analyser system so as to conform with the varying characteristics and constants of different engine models, including the individual moving components of any given model.

An important and practical feature of the invention provides for direct display of test results for each individual part by an indicator of the "go-no-go" type, thereby eliminating the need of special skills for interpreting test results.

The invention will be more fully set forth in the following description referring to the accompanying drawings, and the features of novelty will be pointed out with particularity in the claims annexed to and forming a part of this specification.

The nature of the various acoustical signals that are picked up for use in the analyser of this invention will first be briefly considered. A turbojet engine, for example, emits sound of two different characteristics. Rotating components emit sound where the frequency and amplitude are relatively stable and may be predicted or repeated. These are termed discrete signals. The action of fuel burning and the interaction of the high velocity exhaust streams with stationary air produces sound or "noise" which is termed random. A random signal is an extremely complex one; it contains all frequency components in the sound spectrum and each frequency component may have practically any amplitude and phase at a given instant of time.

Random noise may only be described in statistical terms. The amplitude of a frequency component of the signal, which is characteristic of a rotating element, will be the sum of the fixed amplitude obtained from the rotating element and the random signal at that frequency. Any discrete frequency analysed will therefore have a randomly varying amplitude; however, the time average will be equal to the fixed amplitude of the discrete frequency.

The noise produced by a gear train is a function of shaft speed and number of gear teeth. In a properly operating gear train, the amplitude of this signal is very low. As the gear train deteriorates, the signal amplitude increases. The fundamental frequency is calculated from the following relationship:

$$f_g = \frac{RPM_g}{60} N_t$$

where:
$f_g$=fundamental gear frequency emitted
$RPM$=r.p.m. of gear
$N_t$=number of gear teeth The product of r.p.m. and number of teeth for any gear in a given train remains constant. Hence, for predicting characteristic gear train frequencies, the relationship is conveniently calculated from the driving gear.

The fundamental frequency obtained from a compressor or turbine stage is due to the impulse given the air each time a blade passes a given location. The frequency here is given by:

$$f_b = \frac{RPM_e}{60} N_b$$

where:
$RPM_e$=engine r.p.m.
$N_b$=number of blades on wheel
$f_b$=expected stage frequency If any blade or blades are damaged, the train of impulses will not be of uniform amplitude and new frequencies will be introduced. These new frequencies are given by:

$$(f_{sb})_n = f_b + nf_s$$

where:

$f_s$ = shaft frequency = $RPM_e/60$
$f_b$ = fundamental blade frequency
$n$ = integer
$(f_{sb})n$ = $n$th order side band frequecny The term "side band frequency" is used because of the similarity of the problem to amplitude modulation and the presence of these side band frequencies indicates damaged blades.

The signal obtained from a deteriorating bearing may contain any one of or all of several fundamental frequencies. These frequencies are produced by such action as the impact of a bad ball or roller against both inner and outer race, the impact of all balls against a bad spot on either race and other bearing faults, as well as combinations and harmonics of these frequencies.

The expected characteristic frequencies for a given rotating element are confirmed and established for comparative purposes by actual test on a normally functioning engine running at a reference r.p.m. As jet engines at "idle" r.p.m. run at about half maximum speed, the idle speed characteristic of a particular engine provides a convenient reference for testing its moving components. The characteristic frequencies, above, for the respective elements have been found to fall within definite spectral bands.

Referring now to the drawings:

FIG. 1 is a block system diagram generally illustrating application of the invention to a turbojet engine;

FIG. 2 illustrates graphically the functioning and purpose of the normalizing filter in the system of FIG. 1;

FIG. 3 is a circuit diagram of the phase lock detector in the system of FIG. 1; and FIG. 4 illustrates graphically the functioning of the phase detector shown in FIG. 3, and FIG. 5 includes test data for FIG. 1.

In FIG. 1, a conventional turbojet engine E is represented having as essential parts a front main bearing section 20, compressor stage section 21, center main bearing section 22, burner section 23, turbine stage section 24 (including rear main bearing), exhaust section 25 and accessory section 26 including gear trains, etc. The sensitive non-directional microphones A and B (hereinafter for convenience called "mikes") are responsive to radiated acoustical energy and are located in non-contact air-spaced relation to the engine near selected regions that include essential moving parts, such as those mentioned above. In practice, the region selected for a mike location depends on the engine design and the specific information desired.

For example, the mike A is shown adjacent to the group including the front main bearing, first stages of the compressor and accessories, and mike B is shown adjacent to the group including the center main bearing, turbine stages and rear main bearing. Accordingly, each mike can be up for useful analysis acoustical energy radiated from a comparatively large region of the engine, as compared with "spot" pick-up. This energy represents the combined sound frequencies, both discrete and random, of all the important rotating elements in that region. It will be noted that the signals from each region include a comparatively strong and definite r.p.m. signal, such as initial stage compressor signal from A, and a later stage compressor signal and/or turbine signal from B.

The signals described above are fed selectively from the mikes A and B through conventional cathode-follower and power supply circuitry indicated generally at CF and PS, respectively, to the analyser system. A selector 27 having two switches $S_1$ and $S_2$ conducts the selected mike signals into two main channels of the analyser, namely, a "Data Channel" and a "Control Channel." The mike A signals selected in the present instance are conducted to the data and control channels through the $a_2$ and $a_1$ contacts, respectively, of the selector switches $S_2$ and $S_1$. The data channel processes the mike signals so as to represent by a voltage responsive meter the comparative mechanical condition and/or functioning of a selected moving part of the enigne, and the control channel processes the mike output for r.p.m. "tracking" and control of the data channel, thereby to compensate for ordinary engine speed fluctuations with respect to a reference speed established as the standard for test. Test results at the display meter are therefore consistently reliable, as they conform to the ideal condition wherein the engine speed is fixed.

Referring first to the data channel, the mike A signal from switch $S_2$ enters a data input amplifier with manually adjustable gain control, indicated generally in two stages at 28. This amplifier is of the conventional transistor type and has in its input circuit two potentiometers 29 and 30 for normalizing the output of mikes A and B, respectively, i.e., obtaining tolerable uniformity as regards significant signals. For purposes of gain control, the amplifier has two stages of adjustable cascaded attenuators 31 and 32 arranged in well-known manner for accommodating the amplitude range of each discrete input signal. The adjustments at 31$a$ and 32$a$, respectively, are made according to the characteristic known signal level for normal respective engine parts, as determined by previous data from a properly operating engine.

The amplified and properly attenuated mike signal at this point still comprises, as indicated above, all the discrete frequencies of interest in the analysis of the engine, namely, $f_1, f_2, f_3 \ldots f_n$, respectively, the frequency $F_L$ used to lock the analyser to the engine r.p.m., and noise over the entire frequency region.

This amplified composite signal is fed in turn at 32$a$ to a balanced modulator 33 and is mixed with a HF signal from a so-called frequency ratio generator 34 in the control channel. The latter HF signal serves as a carrier, corrected for engine speed fluctuations. This carrier signal will be more fully discussed below in connection with the control channel operation.

Returning to the data channel, the balanced modulator per se, which comprises a dual differential transistor and a differential transformer as two essential parts, is not shown in detail as it is essentially the transistor counterpart of a conventional vacuum tube balanced modulator, such as that described in "Modulation Theory" by Harold S. Black, 1955. It is sufficient here to state that the amplified data input signal fed to the modulator is mixed with the aforesaid carrier signal, and that the output of the modulator suppresses the carrier but contains all sums and differences of the data input and carrier signal frequencies.

This output is in turn fed at 33$a$ to the intermediate frequency (IF) amplifier and filter at 35 which passes only frequencies within a narrow band (15 c.p.s.) at 200 kc., for example. In the block circuitry indicated, FIG. 1, there are four series-connected stages of IF amplification at 36, 37, 38 and 39, respectively. The first, second and fourth stages, 36 37 and 39, are conventional amplifiers followed by a double-tuned transformer, whereas the third stage includes a crystal filter with square response, i.e., type Tchebytchev of order 4, as known to the art. The center frequency is 200 kc., with a narrow band of 15 c.p.s. This crystal controlled filter passes within a very narrow pass-band a 200 kc. signal from the balanced modulator and suppresses all other signals, as explained below. This filter output signal is fed to a fourth IF amplifier stage 39, the amplitude of its output signal being proportional to the amplitude of the selected signal in the IF input under study, as will be presently described under "Control Channel." This amplitude is averaged at the detector DET, and the display meter 40 is responsive to the resulting DC signal for indicating within ranges, such as color bands, "good," "fair" and "poor" in order of signal magnitude, the comparative condition of the part tested.

In order to normalize the outputs of the mikes A and B and thereby compensate for mike sensitivity and reverberation changes dependent on location of the engine, etc., that otherwise would result in deviations in mike and display meter sensitivity, a so-called normalizing or calibration filter NF is arranged to be connected in shunt at 41 and 42 across the IF crystal controlled filter unit 38. This connection is made only during calibration for intially adjusting the display meter, such as for a definite placement of the corresponding mike at the engine, or for a different engine. Specifically, the filter NF is of band-pass piezoelectric type with a center frequency of 200 kc., for example, and band width of approximately 400 c.p.s. The control signal for the normalizing function is chosen so that the band width lies solely within a selected steady-noise spectrum of the engine tested, as shown in FIG. 2. As a characteristic noise spectrum, especially one in the lower frequency range, does not shift materially for different engines of the same model, the normalizing filter need not be changed for testing of such engines.

The essential purpose of the normalizing filter therefore is to adjust the amplitude of the test signal to a desired amplitude level. This is illustrated by the characteristic oscillographs of FIG. 2 which show typical signal levels for two different engines, namely, Engine I and Engine II, of the same model. The filter NF functions according to known practice to maintain signal levels for different engines of the same model at one preferred standard, say that of Engine I, to which the display meter is adjusted. In order readily to accommodate testing engines of other models having different sound level characteristics, etc., the filter NF may conveniently be made as a replaceable plug-in unit. During normal testing, it is disconnected, as shown.

Summarizing briefly signal processing in the data channel, the mike A signal is first amplified to the extent required by the input amplifier 28. The amplified signal is then mixed in the balanced modulator with the carrier signal of the frequency ratio generator (control channel). The mike signal frequency contains, among others, a frequency $f_1$ that is characteristic of the part under test at the prevailing engine speed. The signal from the frequency ratio generator consists of a single HF tone having a frequency equal to the center frequency of the IF amplifier, above, i.e., 200 kilocycles, plus an r.p.m. corrected signal frequency $Kf$ of the part tested. As corrected for r.p.m. tracking, $Kf=f_1$. The balanced modulator output comprises the sum and the difference, respectively, of the mike signal $f_1$ and the frequency ratio generator signal $(200+kf_L)$ kilocycles. Hence, the output difference frequency $(200+Kf_L-f_1)$ kilocycles of the modulator represents simply the 200 kc. signal, the amplitude of which corresponds to the amplitude of the test signal. Other signal combinations, including the output sum frequency $(200+Kf_L+f_1)$ kilocycles of the modulator, are suppressed by the narrow band-pass IF stage.

The data channel processing is completed by IF amplification and detection for energizing the display meter 40, as described above.

*Control channel*

The signal output from either mike A or mike B may be simultaneously processed in the control channel, FIG. 1, for producing an r.p.m. corrected signal for the balanced modulator 33, described above. The signal is fed through switch $S_1$ or $S_2$, as the case may be, to a band-pass selectivity filter 45. The filter selects one portion of the sound spectrum that contains a signal frequency of interest (initial compressor stage, for example) to which the analyser can be locked for r.p.m. control. The selectivity filter has a center frequency $f_c$ that is equal to the locking frequency $f_L$ at the reference or analysis speed of the engine part, i.e., the compressor stage in question. The output of the filter therefore contains the discrete frequency $f_L$, plus noise over the band $f_c \pm \Delta f$, where $2\Delta f$ is the pass-band width. The pass-band is sufficiently wide to pass the locking frequency $f_L$ over a wide range of r.p.m. fluctuations, while rejecting a major portion of the low frequency noise and other strong discrete frequencies.

For greater flexibility in engine testing, the band-pass unit 45 for the control channel, as well as the normalizing filter NF above, may comprise standard plug-in units for quickly adapting the analyser to other engine models. The remainder of the analyser system includes built-in adjustments that provide for a wide range of engine testing under different conditions.

The filtered signal is in turn fed to a so-called phase lock detector 46 which is basically an efficient closed-loop system for tracking a narrow-band sinusoidal signal corrupted by a wide band noise. It delivers to the frequency ratio generator 34, for purposes hereinafter described, a pure tone signal at frequency $f_L$, containing no noise.

The functions required here of the phase lock detector system are: (1) to filter out from the mike signal a sinusoidal signal generated by a selected rotating part of the engine; (2) to follow the characteristic slow fluctuations in rotational speed of the engine with respect to the reference speed, while maintaining a phase lock condition; and (3) to provide a differential indication of the engine r.p.m., and serve as a differential tachometer.

To these ends, the system comprises a detector that senses phase, and therefore frequency differences between the filtered input signal and a local voltage controlled oscillator (VCO) signal. The VCO is initially set to correspond with the frequency of the compressor signal, above, at "idle" (reference) r.p.m. It is in turn controlled by a resulting difference signal for reducing by feedback this frequency difference to zero, thereby establishing an in-phase lock of the input and oscillator signals. This lock, which serves to regulate the input for the frequency ratio generator 34, ties the analyser to the actual engine speed for r.p.m. tracking.

The theory of operation of component parts of the phase lock detector is known, referring to references cited below [1]; therefore, a brief explanation of component circuitry will be sufficient for an understanding of the present invention.

Referring first to the block diagram of FIG. 1, the input signal for the phase lock detector is fed from the band-pass filter 45 at output 45a to transistorized high-gain amplification stages at 47 with limiter and level control as required. The amplified signal at 47a is then fed to a balanced phase detector 48 of conventional type where it is compared in phase with another signal at 49a from the local voltage controlled oscillator 49; instantaneous phase differences between these signals are detected and represented by an output signal that in turn is processed through a double-ended loop filter 50 and a differential amplifier 51 for regulating by feedback control the output of the VCO unit 49, as described above. Conventional manual presetting of the VCO for its initial center frequency is indicated at 49c.

Referring now to the more detailed circuitry of FIG. 3, the band-pass filter signal at 45a is fed to the amplifier 47 having transistor amplification stages at $V_1$, $V_2$ and $V_3$. The amplifier output is fed at 4a into the primary of ---
[1] Chaffee, J.G., "Application of Negative Feedback to Frequency-Modulation Systems," Bell System Technical Journal 18: 404–437, July 1939.
R. Jaffee and E. Rechtin, "Design and Performance of Phase Lock Circuits . . .," IRE Transactions on Information Theory, March 1955.

one transformer $T_1$ of the balanced phase detector 48, and the VCO signal is fed at 49a into the primary of the other transformer $T_2$. The sum and the difference of the two AC signals from the transformer secondaries are then fed to the detectors $CR_1$ and $CR_2$, respectively. With the detectors functioning as envelope detectors, their outputs $e_1$, $e_2$ comprise two DC signals whose difference in magnitude varies linearly with phase shift from zero to 180 degrees, FIG. 4. These outputs are fed at 48a and 48b to opposite terminals, respectively, of the loop filter 50. The analytical expressions for the two outputs are developed in the reference, "Modulation Theory" by Black, supra.

The loop filter DC output signals (difference) are fed into the differential amplifier 51 at 50a and 50b, respectively, from which the difference signals are fed back into the VCO at 51a and 51b.

The VCO is of conventional transistorized type, having initial oscillator stages at $V_4$, $V_5$ and output stage $V_6$. The voltage control unit for the oscillator is shown at VC. Four coils, 1, 2, 3 and 4, are inductively related in known manner for controlling the output frequency of the oscillator. Coil 1 is coupled to the initial oscillator stages $V_4$, $V_5$; coil 2 to the oscillator output stage $V_6$; coil 3 to the output leads 51a and 51b of the differential amplifier 51; and coil 4 to a pre-set potentiometer, as shown, with adjustment at 49c. A DC signal from the differential amplifier on coil 3 changes in known manner the inductances of coils 1 and 2. The sense of this signal may be positive or negative, depending on the sense of engine drift from reference r.p.m. The inductance change, above, causes change in the oscillator frequency in a sense to reduce the AC signal on coil 3 to zero, and to establish a quiescent DC signal indicative of the r.p.m. deviation from its preset or reference value.

The differential amplifier is transistorized with input stages at $V_7$ and $V_8$, and output stages at $V_9$ and $V_{10}$. The input stages of the amplifier are coupled to a "drift" compensating potentiometer with adjustment at 51c. An equilibrium is established when the AC signal across the output terminals 51a and 51b of the differential amplifier is zero, indicating that the analyser is on-track, so to speak, as regards the characteristic variable drift of engine r.p.m.

As the DC output signal of the differential amplifier 51 is a measure of engine r.p.m. deviation from reference r.p.m., this signal is used at the zero centered meter (tachometer) 52 for indicating by suitable units such deviation.

The response of the phase detector 48 is graphically illustrated by FIG. 4, wherein the voltage envelopes of the detectors $CR_1$ and $CR_2$ are the curves $e_1$ and $e_2$, respectively, on a base of 180 degrees, and the difference or algebraic summation voltage is the line $(e_1-e_2)$. The phase relationship between the input and output signal is established by the straight line $(e_1-e_2)$ of FIG. 5, with its center point corresponding to the case where the input signal frequency is equal to the preset frequency of the oscillator.

The output of the VCO at 49b accordingly represents the locking frequency $f_L$ which embraces the variation of engine r.p.m.

For the purpose of readily changing the analyser characteristics for testing in sequence a number of the engine parts, each having different discrete signal frequencies, $f_1$, $f_2$, $f_3$, etc., the frequency ratio generator 34 produces a local oscillator HF signal, herein selected at 200 kc., and adds to the HF signal frequency a low frequency signal representing $Kf_L$, where K is the ratio at reference speed between the characteristic signal frequency of the part under test, and the characteristic signal frequency of the main r.p.m. component originally selected, i.e., the initial compressor stages. The constant K is manually set into the frequency ratio generator by test personnel using previously established reference speed data; for example, if at reference r.p.m. the characteristic signal frequency of the test part (accessory gear box train) is 2800 c.p.s., and the signal frequency of the component selected for r.p.m. tracking (final compressor stage) is 5600 c.p.s., the ratio or "K value" is 0.5. The signal Kf therefore represents correctly the instant adjusted signal frequency of the test part, as the K factor does not change with fluctuations in engine r.p.m., i.e., the frequencies of the discrete signals in question in the data and control channels vary in the same ratio during engine speed fluctuation. As previously described, the output of the frequency ratio generator, 200 kc.$+Kf$, is fed, together with the data mike signal, to the balanced modulator 33, the output of which is a 200 kc. signal, that after passage through the IF amplifier 35 and detector is displayed as a DC signal by the meter 40.

The frequency ratio generator per se is not a part of the present invention and is fully disclosed and claimed in a copending application filed concurrently herewith by Houchang Handjani for "Frequency Ratio Generator," and is assigned to the same assignee as the present invention.

For summarizing the description of the invention, a possible situation in the analysis of a turbojet engine will be examined. It will be assumed that the tone used to track the engine r.p.m. is, for example, from the 5th stage compressor, the frequency of which here is 8000 c.p.s. at "idle" r.p.m., chosen as reference speed; also, that the signal of special interest is that generated within the gear box by meshing gear teeth, at 3600 c.p.s., reference speed. For convenience in following signal processing, general reference is also made to FIG. 5 which is an outline of FIG. 1 with signal frequency data added.

The mike signal, which includes the discrete gear teeth 3600 c.p.s. signal $f_1$, together with other discrete signals and noise, is fed to the data channel, as described above, and is basically unchanged until reaching the balanced modulator 33. In practice, the mike signal fed to the control channel can be from either mike A or B, depending on the preferred placement of the mikes for optimum radiation of the tracking signal energy, etc.

Since the center frequency of the band-pass filter 45 in the control channel is $f_L$ at reference analysis speed, i.e., 8000 c.p.s. and the pass-band is sufficiently wide to provide for material fluctuations in engine r.p.m., such as 10% or more, the control channel signal (now amplified) fed to the phase locked detector system 46, FIG. 3, is 8000 c.p.s. $\pm \Delta f$ and noise, depending on engine r.p.m. The VCO signal, which initially is set at 8000 c.p.s., is fed along with the filter signal, above, to the phase detector 48, the output of which is the difference between these two AC input signals. This difference or error signal, $+\Delta f$ or $-\Delta f$, as the case may be, is fed in turn to the smoothing loop filter 50. At the differential amplifier 51, the error signal is changed to a DC signal and then applied to the control coil 3 of the VCO control unit VC for changing the oscillator frequency in a direction sense to reduce the error signal to zero.

At zero difference, the two phase detector input signals at 47a and 49a are, of course, locked in phase. The output of the VCO at 49b and hence the phase lock detector output constitute the phase locked frequency $f_L$ used to compensate for deviation of engine speed from reference r.p.m. This signal is a pure tone and since it changes as r.p.m. changes, the phase lock detector 46 output can be said to track and lock into phase with the control channel input compressor signal frequency representing actual r.p.m.

The frequency ratio generator 34 in this case is manually adjusted for a K ratio, 0.45, i.e., the ratio of gear teeth reference frequency 3600 c.p.s. to the compressor reference frequency 8000 c.p.s. The output of the frequency ratio generator includes a 200 kc. signal, to which is added $Kf_L$, the VCO corrected $f_L$ output signal multiplied by 0.45, i.e. $(200+0.45f_L)$ kilocycles. Assuming 10% temporary over-speed of the engine so that the input signal frequency $f_L$ at the phase lock detector is 8800 c.p.s., then $0.45f_L$ becomes 3960 c.p.s.; the output frequency at the frequency ratio generator is therefore (200+3.960) kilocycles, or 203.96 kc. This output is a sine wave of constant amplitude. When it is mixed at the balanced modulator 33 with the data channel signal (which includes the gear teeth signal $f_1$, also now at 3960 c.p.s., due to the engine over-speed), the two output signals, i.e. the sum and difference of the mixed signals, are primarily (203.96+3.96) kc. and (203.96−3.96) kc., respectively. As the IF amplifier has a center frequency of 200 kc. (with narrow band at the crystal controlled filter, 3rd stage), the "sum" frequency will be rejected; as the "difference" frequency equals 200 kc., the difference signal, which corresponds in amplitude to the data channel 3960 c.p.s. signal, passes through the IF amplifier, is converted to DC by the detector DET, and displayed at the display meter 40 as a measure of gear teeth condition. The meter indication is proportional to the amplitude of the data input gear teeth signal, corrected to correspond to reference r.p.m. frequency.

The r.p.m. variation meter 52, which also gets the "error signal" from the output of the differential amplifier 51, functions as a fast-response, sensitive tachometer for displaying useful information, as the inability of a machine to hold a reasonably close tolerance on an r.p.m. setting is, in itself, an indication of trouble.

A typical example of the usefulness of the present invention in forecasting trouble is that of bearing analysis. In a test on a center-main bearing, the display signal showed an increase in amplitude, i.e., display meter indication toward "yellow" and "red." The bearing had in fact but one fault (single spall, outer race); its remaining life was judged by bearing specialists to be in excess of 100 engine operating hours.

Accordingly, the invention can be said to function at the threshold of detection ability for providing maintenance personnel with large lead time to actual failure; this makes possible scheduling of repair periods based on repair needs, with concentration of maintenance effort on the most critical items.

It should be understood that this invention is not limited to specific details of construction and arrangement thereof herein illustrated, and that changes and modifications may occur to one skilled in the art without departing from the spirit of the invention. For example, in special instances where a strong r.p.m. tracking signal is desirable, the control channel signal can be derived from an engine shaft-connected tachometer. This signal, which in practice is a pure tone signal, can be fed directly, subject, of course, to appropriate amplification or attenuation, to the phase detector at 48 for processing in in the same manner as the filtered mike signal. The discrete signals in such case would be fed to the data channel in the same manner as shown in FIG. 1.

We claim:

1. An engine analyser system for detecting incipient and actual mechanical malfunction of essential rotating components of a high-speed engine that is set for operation at a predetermined reference r.p.m., comprising means for producing electrical signals representing the sound spectrum from a selected region of the engine, an electrical signal of frequency corresponding to engine r.p.m., said spectrum including a discrete signal of frequency that is characteristic of a rotating component selected for test, and electronic analysing means for receiving all the aforesaid signals and for displaying information directly indicating the operative condition of the selected test component as compared with that of a normal counterpart, said analysing means comprising a data signal channel and a control signal channel, the data channel having means for mixing said sound spectrum signals and a variable r.p.m. tracking signal from the control channel, said control channel including a local source for producing a reference signal of variable frequency, automatic tracking means responsive to any phase difference between the engine r.p.m. signal frequency and the local signal frequency for locking the phase of the local signal frequency to that of said r.p.m. signal, said locked local signal determining the variable of the aforesaid r.p.m. tracking signal, means for selecting from the output of said mixing means a constant frequency signal whose amplitude corresponds to the amplitude of the discrete test signal, and a display indicator operable according to the magnitude of said constant frequency signal for visually indicating the operative condition of the rotating test component, as compared with that of a similar normal component.

2. An engine analyser system as specified in claim 1, wherein the data channel signal mixing means is a balanced modulator, and the r.p.m. tracking signal from the control channel consists of a high frequency signal, its frequency being the sum of a constant frequency and a variable frequency that is a function of the aforesaid locked signal frequency.

3. An engine analyser system as specified in claim 1, wherein the control channel tracking means comprises a phase lock detector system including a phase detector and said local signal source for varying the phase of the local signal frequency and locking it in phase with the r.p.m. signal frequency, said local signal frequency being controlled by feedback according to the instant difference between said frequency and the frequency of the r.p.m. signal.

4. An engine analyser system as specified in claim 1, having frequency changing means for receiving the locked local frequency signal and changing the frequency thereof in ratio to correspond with the instant frequency of the data channel discrete test signal.

5. An engine analyser system as specified in claim 2, wherein the constant frequency is high compared with the variable frequency, and the output of the modulator includes a signal of high frequency, said high frequency being the difference frequency of the modulator input signals modulated in amplitude to correspond to the amplitude of the test component signal.

6. An engine analyser system as specified in claim 3, wherein the local signal source is an oscillator of the controlled frequency type that is initially adjusted to a frequency corresponding to that of the r.p.m. signal at reference r.p.m., and the phase detector receives both the local and r.p.m. signals for producing a deviation signal that determines said feedback control.

7. An engine analyser system as specified in claim 2, wherein the data channel includes a narrow-band intermediate frequency filter that receives the output of the balanced modulator for passing the signal of constant high frequency, modulated in amplitude, to means for energizing the display indicator.

8. An engine analyser system as specified in claim 1, wherein a band-pass filter having a center frequency corresponding to the characteristic signal frequency of an engine component rotating at reference r.p.m., with a pass-band of material width for accommodating wide fluctuations in engine r.p.m., receives engine sound spectrum signals including the engine component signal for producing the engine r.p.m. signal.

9. An engine analyser system as specified in claim 7, wherein the data channel has a normalizing band-pass filter system having a center frequency and pass-band within a typical low level noise frequency band of the data channel input, arranged to be temporarily connected in shunt with the narrow-band intermediate frequency filter for initial normalizing adjustment of the display indicator at a preferred signal intensity level.

10. An engine analyser system as specified in claim 1, wherein the phase locked local signal is a pure tone sinusoidal tracking signal of frequency like that of the engine r.p.m. signal, and the control channel also includes a frequency changer for adjusting in ratio the pure tone signal frequency to the characteristic frequency of the discrete signal in the data channel input and adding the adjusted signal frequency to that of a high constant frequency signal to constitute the output of the frequency changer, and the data channel mixing and selecting means are respectively a balanced modulator and intermediate frequency filter, the frequency changer output signal constituting one input to the balanced modulator and the sound spectrum data channel signals the other input, the intermediate frequency filter including a narrow-band crystal controlled filter for receiving the output of the balanced modulator and passing only an amplitude modulated signal of said high constant frequency, corresponding in magnitude to that of the discrete test signal, the display indicator being energized according to the magnitude of said modulated signal.

References Cited

UNITED STATES PATENTS

| | | | |
|---|---|---|---|
| 2,174,176 | 9/1939 | Journeaux et al. | 73—67 |
| 2,361,990 | 11/1944 | Brown | 73—67 |
| 3,059,187 | 10/1962 | Jaffe | 324—83 |

FOREIGN PATENTS

| | | |
|---|---|---|
| 1,129,181 | 9/1956 | France. |
| 737,795 | 10/1955 | Great Britain. |

JAMES J. GILL, *Primary Examiner.*